(12) United States Patent
Kwon et al.

(10) Patent No.: US 9,499,687 B2
(45) Date of Patent: Nov. 22, 2016

(54) POLYPROPYLENE RESIN COMPOSITION

(71) Applicants: Hyundai Motor Company, Seoul (KR); Hyundai Engineering Plastics Co., Ltd., Dangjin-kun, Choongchungnam-Do (KR)

(72) Inventors: Oh-Deok Kwon, Kyounggi-Do (KR); Dae-Sik Kim, Kyounggi-Do (KR); Beom-Ho Kim, Choongchungnam-Do (KR); Hyeong-Geun Oh, Dangjin-Shi (KR); Tae-Hyung Kim, Choongchungnam-Do (KR)

(73) Assignees: Hyundai Motor Company, Seoul (KR); Hyundai Engineering Plastics Co., Ltd., Dangjin-kun, Choongchungnam-do (KR)

( * ) Notice: Subject to any disclaimer, the term of this patent is extended or adjusted under 35 U.S.C. 154(b) by 35 days.

(21) Appl. No.: 14/556,119

(22) Filed: Nov. 29, 2014

(65) Prior Publication Data

US 2015/0225558 A1 Aug. 13, 2015

(30) Foreign Application Priority Data

Feb. 7, 2014 (KR) .......................... 10-2014-014354

(51) Int. Cl.
*C08L 23/12* (2006.01)
*C08L 23/10* (2006.01)

(52) U.S. Cl.
CPC ............ *C08L 23/10* (2013.01); *C08L 2205/03* (2013.01); *C08L 2205/035* (2013.01)

(58) Field of Classification Search
CPC ........................... C08L 23/12; C08L 2205/03
USPC ..................................................... 524/35, 502
See application file for complete search history.

(56) References Cited

U.S. PATENT DOCUMENTS

| | | | |
|---|---|---|---|
| 2004/0123962 A1* | 7/2004 | Shannon et al. | 162/9 |
| 2006/0173105 A1* | 8/2006 | Griffin et al. | 524/35 |
| 2010/0178506 A1* | 7/2010 | Boerzel et al. | 428/396 |

FOREIGN PATENT DOCUMENTS

| | | |
|---|---|---|
| KR | 10-0962512 B1 | 6/2010 |
| KR | 10-2011-0048245 A | 5/2011 |
| KR | 10-1293920 B1 | 8/2013 |
| KR | 10-2013-0103154 A | 9/2013 |

\* cited by examiner

*Primary Examiner* — James J Seidleck
*Assistant Examiner* — Deve E Valdez
(74) *Attorney, Agent, or Firm* — Mintz Levin Cohn Ferris Glovsky and Popeo, P.C.; Peter F. Corless

(57) ABSTRACT

Provided is a polypropylene resin composition. The polypropylene resin composition includes: from about 20 to about 80 parts by weight of a polypropylene resin; from about 1 to about 35 parts by weight of an amine-based kenaf master batch; and from about 1 to about 25 parts by weight of a vinyl-based acetal compatibilizer. Also disclosed is the polypropylene resin composition which is used for vehicle interior and exterior materials, thereby improving physical properties such as low-temperature properties and tensile strength and providing superior resistance against damages.

6 Claims, 2 Drawing Sheets

POLYPROPYLENE RESIN COMPOSITION

CROSS-REFERENCE TO RELATED APPLICATIONS

This application claims priority under 35 U.S.C. §119 to Korean Patent Application No. 10-2014-14354, filed on Feb. 7, 2014, in the Korean Intellectual Property Office, the entire contents of which is incorporated herein by reference.

TECHNICAL FIELD

The present invention relates to a polypropylene resin composition, and in particular, a polypropylene resin composition used for interior and exterior materials of a vehicle. The polypropylene resin composition provides improved physical properties such as low-temperature properties and tensile strength, thereby having superior resistance against damages.

BACKGROUND

As issues in environment and energy are growing in the vehicle industry, many vehicle companies have been developing technologies to reduce weight of vehicle bodies for improved fuel efficiency.

Among materials used in a typical vehicle, metals may be comprised in about 65% of the vehicle weight and plastics may be comprised in about 13% of the vehicle weight. The portion of the plastic materials in the vehicle is increasing by replacing the metal materials used in the vehicle body with plastic materials in order to reduce the vehicle weight.

Particularly, polypropylene may be used in approximately 35% of the plastic materials in the vehicle. Polypropylene has advantages such as low material costs and excellent processibility. Accordingly, for simple injection molding, polypropylene may be used in vehicle interior parts such as automotive instrument panels, door trims, console bodies, pillars and trims, or coated and uncoated vehicle parts such as bumpers, side moldings and sill side moldings by adjusting content of the composition polypropylene to provide suitable flow characteristics such as flowability.

As described above, demands for plastic materials used as vehicle parts in the field of vehicle industry have been steadily increasing in continuous efforts to reducing weight and improving performance of the materials. Particularly, among various plastic materials, demands for polyolefin has been rapidly increasing compared to other plastic materials due to the effect in reducing weight from low density, simple recycling, relatively low costs and the like.

Required rigidity and impact characteristics are different depending on interior and exterior materials of the vehicle parts, and consequently, various resin compositions may be used in combination to satisfy the required characteristics.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention now provides a novel polypropylene resin composition to which a natural fiber, particularly kenaf, is added in constant amounts. Thus, the polypropylene resin may be used as an alternative material for vehicle interior part, or particularly instrument panel for which the highest physical property level is required among other interior parts.

In one aspect, a polypropylene resin composition having excellent physical properties is provided. The poly propylene resin may include an amine-based kenaf master batch, in which a polypropylene resin and an amine-based compatibilizer are introduced to a natural fiber, particularly kenaf, together with a vinyl-based acetal compatibilizer.

In an exemplary embodiment, the polypropylene resin composition may include: from about 20 to about 80 parts by weight of a polypropylene resin; from about 1 to about 35 parts by weight of an amine-based kenaf master batch; and from about 1 to about 25 parts by weight of a vinyl-based acetal compatibilizer, with respect to 100 parts by weight of the polypropylene resin.

In certain exemplary embodiments, the amine-based kenaf master batch may include from about 60 to about 70 parts by weight of a base resin, from about 1 to about 10 parts by weight of an amine-based compatibilizer including an amine group, and from about 20 to about 40 parts by weight of kenaf, with respect to the 100 parts by weight of the amine-based master batch. In particular, the base resin may be polypropylene, low density polyethylene (LDPE), or a combination thereof.

In addition, the amine-based kenaf master batch may further include other additives such as a flame retardant and a lubricant in an amount from about 0.1 to about 1 parts by weight as necessary, and may further include from about 1 to about 35 parts by weight of an elastomer grafted with from about 0.1 to about 5.0 parts by weight of maleic anhydride with respect to 100 parts by weight of the elastomer.

In certain exemplary embodiments, the elastomer may be one or more selected from the group consisting of acrylic acid, methacrylic acid, itaconic acid, maleic acid, maleic anhydride, fumaric acid and monomethyl maleic acid.

In another aspect, the present invention provides a molded product prepared by ejecting any one of the polypropylene resin composition described above.

Other aspects and preferred embodiments of the invention are discussed infra.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
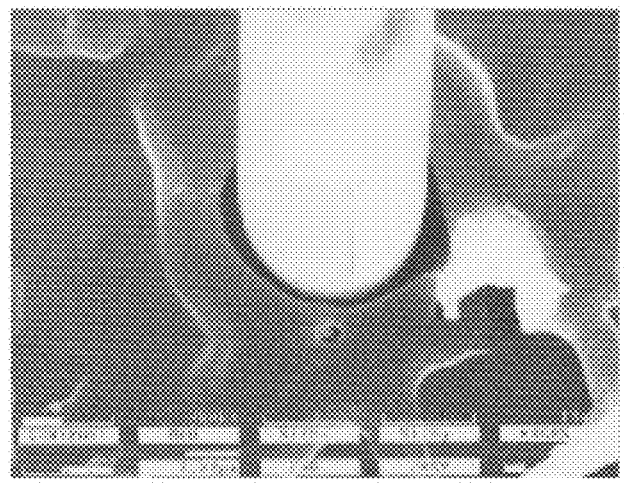
FIG. 1 is a photographic view of a surface of an exemplary injection-molded product which is not treated with a vinyl-based acetal compatibilizer in the related arts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Exemplary embodiments of the present disclosure will now be described in detail with reference to the accompanying tables and drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity.

In one aspect, the present invention relates to a polypropylene resin composition.

In an exemplary embodiment, the polypropylene resin composition may include: from about 20 to about 80 parts by weight of a polypropylene resin; from about 1 to about 35 parts by weight of an amine-based kenaf master batch; and from about 1 to about 25 parts by weight of a vinyl-based acetal compatibilizer, with respect to 100 parts by weight of the polypropylene resin.

In particular embodiments, the polypropylene resin composition may consist essentially of, or consist of: from about 20 to about 80 parts by weight of a polypropylene resin; from about 1 to about 35 parts by weight of an amine-based kenaf master batch; and from about 1 to about 25 parts by weight of a vinyl-based acetal compatibilizer, with respect to 100 parts by weight of the polypropylene resin.

The base resin, as used herein, refers to a basic raw material of the composition. According to an exemplary embodiment, the base resin of the resin composition may be a polypropylene resin. Further, the polypropylene resin, as used herein, may be a type of polyolefin resins or a thermoplastic resin. In certain exemplary embodiments, the polypropylene resin may have a weight average molecular weight of about 100,000 or greater.

Various combinations for polypropylene resin compositions having polypropylene as a base resin may be disclosed. The present invention further provides an environment-friendly composite resin composition including a natural fiber, particularly, "kenaf".

Generally, kenaf is an annual herbaceous plant in the Malvaceae family native to West Africa, and known to be one of the top 3 fiber crops and thus kenaf may be applied to various materials. Particularly, the kenaf is a natural fiber belonging to hemp, and has a nodule structure similar to bamboo joints. Among other natural fibers, the kenaf has more than twice of rigidity compared to cotton, has a similar or greater degree of rigidity of about 70 GPa than other glass fiber, and is alkali-resistant. In addition, the kenaf has a hydroxyl group on the surface, and thus a sizing treatment process may not be required unlike the glass fiber. However, kenaf may not be readily introduced in an extrusion process. Accordingly, by employing the kenaf as a master batch by introducing an amine-based compatibilizer, mechanical and thermal properties may be improved due to the improvement of processibility and compatibility between interfaces.

In certain exemplary embodiments, the amine-based kenaf master batch may include from about 60 to about 70 parts by weight of the base resin, from about 1 to about 10 parts by weight of the amine-based compatibilizer including an amine group, and from about 20 to about 40 parts by weight of the kenaf, with respect to 100 parts by weight of the amine-based kenaf master batch. Particularly, the base resin may be polypropylene, low density polyethylene (LDPE), or a combination thereof.

In certain exemplary embodiments, the amine-based compatibilizer process may include reactive extrusion through a radical reaction in order to graft aromatic diamine within the polypropylene chain. First, polypropylene-aromatic diamine-initiator is mixed using a high speed rotation mixer for sufficient dispersion. In the mixed sample, the polymer chain may be broken due to the heat energy transferred from the reactive extrusion, due to the sheer stress inside a screw, and due to the initiator, and thus the radicals generated may be capable of bonding with other polar groups.

As such, using the amine-based compatibilizer, the base resin and the kenaf to be used in final products may be prepared as a master batch in a constant content through an extruder. Mechanical properties and thermal properties of the composition may be maximized by introducing aromatic diamine having a reactive group to polypropylene (PP), thereby strengthening the chemical bond as well as the physical association between interfaces in the composite material preparation of a PP/polar polymer blend and a PP/filler (kenaf).

In addition, the vinyl-based acetal compatibilizer may be a polymer compound polymerized with vinyl-based acetal, and a polymer compound or a copolymer including vinyl-based acetal or derivatives thereof within the monomer.

In certain exemplary embodiments of the present invention, the polypropylene resin composition may further include from about 0.1 to about 1 parts by weight of additives, and may further include from about 1 to about 35 parts by weight of an elastomer grafted with from about 0.1 to about 5.0 parts by weight of maleic anhydride with respect to 100 parts by weight of the elastomer. As used herein, the additives may be a flame retardant, a lubricant, an antioxidant, a photostabilizer, a releasing agent, a pigment, an antistatic agent, an antimicrobial, a processing material, a metal passivant, anti-blooming agent, a fluorine-based anti-dripping agent, an inorganic filler, glass fiber, a rub resistant and wear resistant agent, a coupling agent, or various combinations thereof. Particularly, the grafted elastomer may include one or more selected from the group consisting of acrylic acid, methacrylic acid, itaconic acid, maleic acid, maleic anhydride, fumaric acid and monomethyl maleic acid.

In other aspect, the polypropylene resin composition according to various exemplary embodiments of the present invention may be used for injection-molded products of a vehicle. The injection-molded products of vehicles may be prepared by, but not limited to, conventional ejecting processes, and by including kenaf and the like. Accordingly, since the polypropylene resin composition may have improved physical properties, instrument panel materials and the like for which the highest level of physical properties may be required among other vehicle parts may be manufactured with the polypropylene resin in the present invention.

Hereinafter, the present invention will be described in more detail with reference to examples. However, these examples are for illustrative purposes only, and it will be apparent to those skilled in the art that the scope of the present disclosure is not interpreted to be limited to these examples.

In the examples described below, a mixture with the components and the compositions described in Table 1 was dry-blended, and subsequently, the mixture was extruded using a twin screw extruder (manufacturer: SM, diameter φ45) set at a temperature of about 220° C. Then, pellets of the resin composition were prepared. Injection-molded products for physical property measurements were prepared by setting the pellet-shaped composition in an injection molder at a temperature of about 210° C. The amine-based kenaf master batch used herein includes about 65 parts by weight of the base resin (PP+LDPE), about 5 parts by weight of the amine-based compatibilizer including an amine group, and about 30 parts by weight of the kenaf, with respect to 100 parts by weight of the amine-based kenaf master batch.

In Table 1, shown are the physical properties of injection-molded products prepared from the compositions in which the amine-based kenaf master batch (AMINE-M/B) and a glass-beaded kenaf master batch (G/B-M/B) were each added, and the vinyl acetal compatibilizer is added respectively in the amount of about 10, about 15 or about 20 parts by weight.

As shown in Table 1, in tensile strength, flexing resistance and impact strength, the injection-molded product in which the amine-based kenaf master batch was added had substantially improved physical properties, and low-temperature properties thereof were improved by including the vinyl-based acetal compatibilizer in approximately from about 1 to about 25 parts by weight with the amine-based kenaf master batch.

Figure 2:
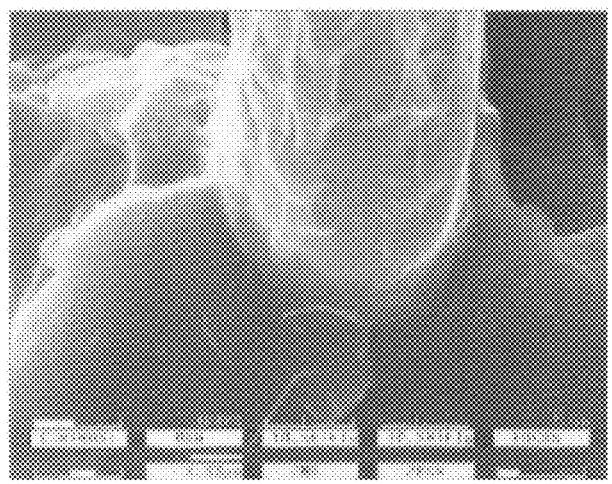
FIG. 2 is a photographic view of a surface of an exemplary injection-molded product treated with a vinyl-based acetal compatibilizer according to an exemplary embodiment of the present invention.

Meanwhile, FIG. 1 is a photographic view of the surface of the injection-molded product in the related arts which is not treated with the vinyl-based acetal compatibilizer, and FIG. 2 is a photographic view of the surface of the injection-molded product which is treated with the vinyl-based acetal compatibilizer according to an exemplary embodiment of the present invention.

Figure 3:
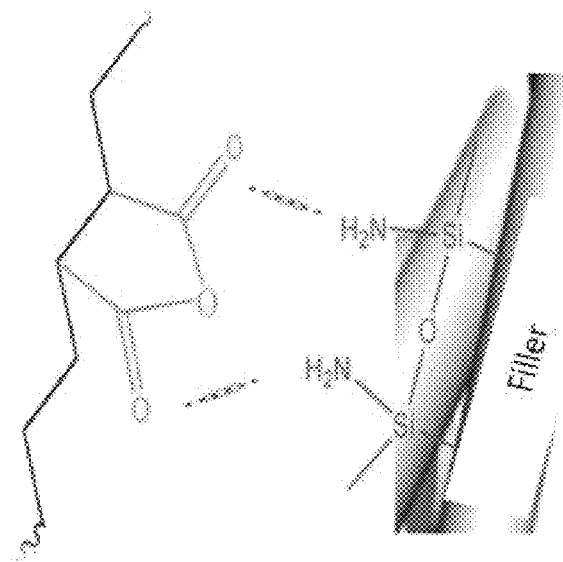
FIG. 3 is a perspective view showing exemplary covalent bonds between an amine-based kenaf master batch and a vinyl-based acetal compatibilizer according to an exemplary embodiment of the present invention.

As shown in FIG. 3, when treated with the vinyl-based acetal compatibilizer, the composition may have significantly improved compatibility since covalent bonds may be formed between the amine-based kenaf master batch and the vinyl-based acetal compatibilizer.

TABLE 2

| Composition | Example 2 | Example 4 | Example 5 | Comparative Example 4 | Comparative Example 5 |
|---|---|---|---|---|---|
| Polypropylene | 74.5 | 64.5 | 54.5 | 44.5 | 74.5 |
| Natural Fiber(Kenaf) AMINE-M/B | 10 | 20 | 30 | 40 | |
| Amino Glass Fiber | | | | | 10 |
| Vinyl-based Acetal Compatibilizer | 15 | 15 | 15 | 15 | 15 |

TABLE 1

| Composition | Example 1 | Example 2 | Example 3 | Comparative Example 1 | Comparative Example 2 | Comparative Example 3 |
|---|---|---|---|---|---|---|
| Polypropylene | 79.5 | 74.5 | 69.5 | 79.5 | 74.5 | 69.5 |
| Natural Fiber (Kenaf) AMINE-M/B | 10 | 10 | 10 | | | |
| Natural Fiber (Kenaf) G/B-M/B | | | | 10 | 10 | 10 |
| Vinyl-based Acetal Compatibilizer | 10 | 15 | 20 | 10 | 15 | 20 |
| Additive | 0.5 | 0.5 | 0.5 | 0.5 | 0.5 | 0.5 |
| Tensile Strength (Mpa) | 37 | 39 | 39 | 35 | 36 | 37 |
| Flexing Resistance (Mpa) | 62 | 64 | 64 | 59 | 60 | 60 |
| IZOD Impact Strength (J/m) 23° C. | 175 | 184 | 184 | 170 | 180 | 180 |
| IZOD Impact Strength (J/m) −10° C. | 103 | 120 | 120 | 100 | 110 | 110 |

TABLE 2-continued

| Composition | Example 2 | Example 4 | Example 5 | Comparative Example 4 | Comparative Example 5 |
|---|---|---|---|---|---|
| Additive | 0.5 | 0.5 | 0.5 | 0.5 | 0.5 |
| Tensile Strength (Mpa) | 39 | 40 | 43 | 45 | 40 |
| Flexing Resistance (Mpa) | 64 | 68 | 72 | 74 | 68 |
| IZOD Impact Strength (J/m) 23° C. | 184 | 160 | 150 | 130 | 50 |
| IZOD Impact Strength (J/m) −10° C. | 120 | 90 | 80 | 60 | 30 |

In Table 2, shown are the physical properties according to the amine-based kenaf master batch content. As shown in Example 2 and Comparative Example 5, tensile strength and flexing resistance were improved when the amine-based kenaf master batch according to the exemplary embodiment of the present invention was used in contrast when the existing amino glass fiber was used as in Comparative Example 5, and impact strength was also significantly improved.

In addition, the polypropylene resin composition according to the exemplary embodiment of the present invention may include the amine-based kenaf master batch in an amount from about 1 to about 35 parts by weight. As shown in Comparative Example 4, when the composition includes the amine-based kenaf master batch in an amount of about 40 parts by weight, moldability was reduced such that the surface became detached during the ejection. Therefore, the master batch preparation was difficult, and it was also demonstrated that impact strength of the injection-molded product was reduced.

TABLE 3

| Composition | Example 6 | Example 7 | Example 8 | Comparative Example 6 | Comparative Example 7 |
|---|---|---|---|---|---|
| Polypropylene | 24.5 | 44.5 | 34.5 | 44.5 | 34.5 |
| Natural Fiber (kenaf) AMINE-M/B | 30 | 30 | 30 | 30 | 30 |
| Vinyl-based Acetal Compatibilizer | 15 | 15 | 15 | 15 | 15 |
| MA-g-EOR | 30 | 10 | 20 | | |
| EOR | | | | 10 | 20 |
| Additive | 0.5 | 0.5 | 0.5 | 0.5 | 0.5 |
| Tensile Strength (Mpa) | 22 | 38 | 37 | 42 | 40 |
| Flexing Resistance (Mpa) | 54 | 76 | 78 | 75 | 77 |
| IZOD Impact Strength (J/m) 23° C. | 320 | 180 | 210 | 170 | 200 |
| IZOD Impact Strength (J/m)−10° C. | 120 | 120 | 115 | 100 | 130 |

In Table 3, shown are the physical properties of the injection-molded product prepared from the composition in which the elastomer grafted with from about 0.1 to about 5.0 parts by weight of maleic anhydride (MA-g-EOR) and a general elastomer (EOR), are respectively added, and the MA-g-EOR is respectively added in about 10, about 20 or about 30 parts by weight. As shown in Table 3, impact strength was improved by adding the elastomer grafted with maleic anhydride in contrast when the general elastomer was added in Comparative Examples 6 and 7.

As set forth above, according to various exemplary embodiments of the present invention, the polypropylene resin composition may provide improved mechanical properties and thermal properties. Particularly, the polypropylene resin composition may be used as instrument panel materials, for which the highest level of physical properties is required among other vehicle parts, by improving tensile strength, flexing resistance, impact strength and the like.

Hereinbefore, exemplary embodiments of the present disclosure have been shown and described above, however, these embodiments are for illustrative purposes only, and the present disclosure is not limited thereto. Those skilled in the art may change or modify the exemplary embodiments described above without departing from the scope of the present disclosure, and various modifications and variations could be made within the spirit of the present disclosure and the equal scope of the appended claims.

What is claimed is:

1. A polypropylene resin composition comprising:
   from about 20 to about 80 parts by weight of a polypropylene resin;
   from about 1 to about 35 parts by weight of an amine-based kenaf master batch; and
   from about 1 to about 25 parts by weight of a vinyl-based acetal compatibilizer,
   with respect to 100 parts by weight of the polypropylene resin,
   wherein the amine-based kenaf master batch includes from about 60 to about 70 parts by weight of a base resin, from about 1 to about 10 parts by weight of an amine-based compatibilizer including an amine group, and from about 20 to about 40 parts by weight of kenaf, with respect to 100 parts by weight of the amine-based kenaf master batch.

2. The polypropylene resin composition of claim 1, wherein the base resin is polypropylene, low density polyethylene (LDPE), or a combination thereof.

3. The polypropylene resin composition of claim 1, further comprising from about 0.1 to about 1 parts by weight of an additive, with respect to 100 parts by weight of the amine-based kenaf master batch.

4. The polypropylene resin composition of claim 3, further comprising from about 1 to about 35 parts by weight of an elastomer grafted with from about 0.1 to about 5.0 parts by weight of maleic anhydride, with respect to 100 parts by weight of the elastomer.

5. The polypropylene resin composition of claim 4, wherein the elastomer is one or more selected from the group consisting of acrylic acid, methacrylic acid, itaconic acid, maleic acid,aleic anhydride, fumaric acid and monomethyl maleic acid.

6. An injection-molded product for a vehicle prepared by ejecting the polypropylene resin composition of claim 1.

* * * * *